(12) United States Patent
Weems et al.

(10) Patent No.: US 7,843,383 B2
(45) Date of Patent: Nov. 30, 2010

(54) IMAGING THROUGH SILHOUETTING

(75) Inventors: William Weems, San Jose, CA (US); Robert C. Taber, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 400 days.

(21) Appl. No.: 11/552,749

(22) Filed: Oct. 25, 2006

(65) Prior Publication Data

US 2008/0161685 A1 Jul. 3, 2008

(51) Int. Cl.
*G01S 13/89* (2006.01)
*G01S 13/00* (2006.01)

(52) U.S. Cl. .............. 342/179; 342/175; 342/176; 342/195; 342/368; 342/371; 342/372

(58) Field of Classification Search ........... 342/5–11, 342/25 R–25 F, 175, 176, 179, 190–197, 342/22, 27, 28, 89, 90, 118, 126, 350, 368, 342/371, 372; 343/753–755, 757–761, 772, 343/775–779, 781 R, 781 P, 781 CA, 783–786, 343/824, 832–840, 700 MS; 356/484

See application file for complete search history.

(56) References Cited

U.S. PATENT DOCUMENTS

| | | | | |
|---|---|---|---|---|
| 3,284,799 A | * | 11/1966 | Ross | 342/179 |
| 3,400,363 A | * | 9/1968 | Silverman | 342/179 |
| 3,652,978 A | * | 3/1972 | Halliday et al. | 342/372 |
| 3,909,827 A | * | 9/1975 | Tricoles et al. | 342/179 |
| 4,030,096 A | * | 6/1977 | Stevens et al. | 342/90 |
| 5,132,693 A | * | 7/1992 | Werp | 342/179 |
| 5,363,297 A | * | 11/1994 | Larson et al. | 342/126 |
| 5,365,237 A | * | 11/1994 | Johnson et al. | 342/179 |
| 5,416,582 A | * | 5/1995 | Knutson et al. | 356/484 |
| 5,563,601 A | * | 10/1996 | Cataldo | 342/25 A |
| 5,680,138 A | * | 10/1997 | Pritt | 342/179 |
| 5,990,822 A | * | 11/1999 | Honigsbaum | 342/90 |
| 6,222,479 B1 | * | 4/2001 | Honigsbaum | 342/195 |
| 6,417,502 B1 | * | 7/2002 | Stoner et al. | 342/179 |
| 6,621,448 B1 | * | 9/2003 | Lasky et al. | 342/179 |
| 6,741,202 B1 | * | 5/2004 | Krikorian et al. | 342/25 C |
| 6,756,934 B1 | * | 6/2004 | Chen et al. | 342/89 |
| 6,777,684 B1 | * | 8/2004 | Volkov et al. | 342/179 |
| 6,965,340 B1 | | 11/2005 | Baharav et al. | |
| 7,109,911 B1 | * | 9/2006 | Cataldo | 342/25 R |
| 7,183,963 B2 | * | 2/2007 | Lee et al. | 342/179 |
| 7,205,927 B2 | * | 4/2007 | Krikorian et al. | 342/25 A |
| 7,224,314 B2 | * | 5/2007 | Lee et al. | 343/700 MS |
| 7,280,068 B2 | * | 10/2007 | Lee et al. | 342/22 |
| 7,283,085 B2 | * | 10/2007 | Lee et al. | 342/6 |
| 7,327,304 B2 | * | 2/2008 | Baharav et al. | 342/22 |
| 7,333,055 B2 | * | 2/2008 | Baharav et al. | 342/179 |
| 2005/0110672 A1 | * | 5/2005 | Cardiasmenos et al. | 342/27 |
| 2006/0119513 A1 | | 6/2006 | Lee | |
| 2006/0214836 A1 | | 9/2006 | Baharav et al. | |

* cited by examiner

*Primary Examiner*—Bernarr E Gregory

(57) ABSTRACT

Improved microwave imaging using a reflector. By providing a reflective surface in the range of the imaging system, additional information is available for imaging objects. The relative surface provides silhouette information on the object, and increases the effective thickness of the object to aid analysis.

8 Claims, 2 Drawing Sheets

IMAGING THROUGH SILHOUETTING

CROSS-REFERENCE TO RELATED APPLICATIONS

This application is related by subject matter to U.S. Pat. No. 7,224,314, entitled "A Device for Reflecting Electromagnetic Radiation," which issued May 29, 2007; U.S. Application for patent Ser. No. 10/997,583, entitled "Broadband Binary Phased Antenna," which was filed on Nov. 24, 2004; and U.S. Pat. No. 6,965,340, entitled "System and Method for Security Inspection Using Microwave Imaging," which issued on Nov. 15, 2005.

This application is further related by subject matter to U.S. Pat. No. 7,283,085, entitled "System and Method for Efficient, High-Resolution Microwave Imaging Using Complementary Transmit and Receive Beam Patterns," which issued Oct.16, 007; U.S. Pat. No. 7,183,963, entitled "System and Method for Inspecting Transportable Items Using Microwave Imaging," which issued Feb. 27, 2007; U.S. Application for patent Ser. No. 11/089,298, entitled "System and Method for Pattern Design in Microwave Programmable Arrays," which was filed on Mar. 24, 2005; U.S. Pat. No. 7,333,055, entitled "System and Method for Microwave Imaging Using an Interleaved Pattern in a Programmable Reflector Array," which issued Feb. 19, 2008; and U.S. Pat. No. 7,327,304, entitled "System and Method for Minimizing Background Noise in a Microwave Image Using a Programmable Reflector Array," which issued Feb. 5, 2008.

TECHNICAL FIELD

Embodiments in accordance with the present invention relate to imaging systems, and more particularly to micro wave imaging systems.

BACKGROUND OF THE INVENTION

Active microwave imaging systems are used to provide information about a target beneath a subject's surface. Active systems provide an emitter of microwaves directed toward a target; the target reflects some fraction of the microwaves to a receiver which in turn detects the presence of reflection. As the ability of microwaves to penetrate a material are dependent on the dielectric constant of the material, some materials such as clothing or cardboard which are opaque when exposed to visible light are transparent when microwave illumination is used.

Currently, active microwave imaging systems include transmit and receive elements and can include antenna arrays for reflecting (focusing) microwave radiation to/from the subject. As receive elements are only capable of detecting radiation received at the element's location, active microwave imaging systems are highly dependent on the geometric components of the subject being imaged, and as such they are prone to "shadowing" or areas where no information is available. This shadowing is expected as specular reflection dominates the image with minimal diffuse information being collected.

The specular reflection domination is predicted as the amount of signal the system receiver obtains decreases as the imaged surface moves from an alignment normal to the receiver, and thus reflects a large proportion of the signal to the receiver, through oblique angles, and toward parallel to the receiver where no signal is returned. If the receiver does not receive a signal from a point or voxel (a three dimensional space within a larger scanned volume) in space, then no image appears at that voxel, and analysis of the image can not determine if a subject is present or not. Thus as far as the system is concerned, there is no difference between no subject being present, and a subject with a surface which is oblique to the receiver.

As mentioned microwave systems are dependent on the dielectric constant of the material imaged. The higher the dielectric constant, the more opaque a subject appears. Therefore, some materials are translucent, and this translucence can cause additional signal interpretation problems. As the imaging of such translucent materials is dependent on the thickness of the material, the ticker the material the easier it is to image. However, as the thickness of the material is reduced, the subject becomes harder and harder to image. At some point, dependent on both dielectric constant and subject geometry, the material in the subject becomes so thin that it is invisible to the image system.

SUMMARY OF THE INVENTION

Imaging using microwaves is improved by placing a reflective surface behind the subject being imaged and within the range of the imager. The use of a reflective surface produces a silhouette of the subject which may be analyzed, and also adds effective thickness to translucent subjects which provides additional information for analysis.

DETAILED DESCRIPTION OF THE INVENTION

The term "microwave radiation" refers to the band of electromagnetic radiation having frequencies corresponding to about 1 GHz to about 1,000 GHz or wavelengths from 0.3 mm to 30 cm. Additionally, the term "microwave imaging system" refers to an imaging systems using microwave radiation for illumination of the subject.

Figure 1:
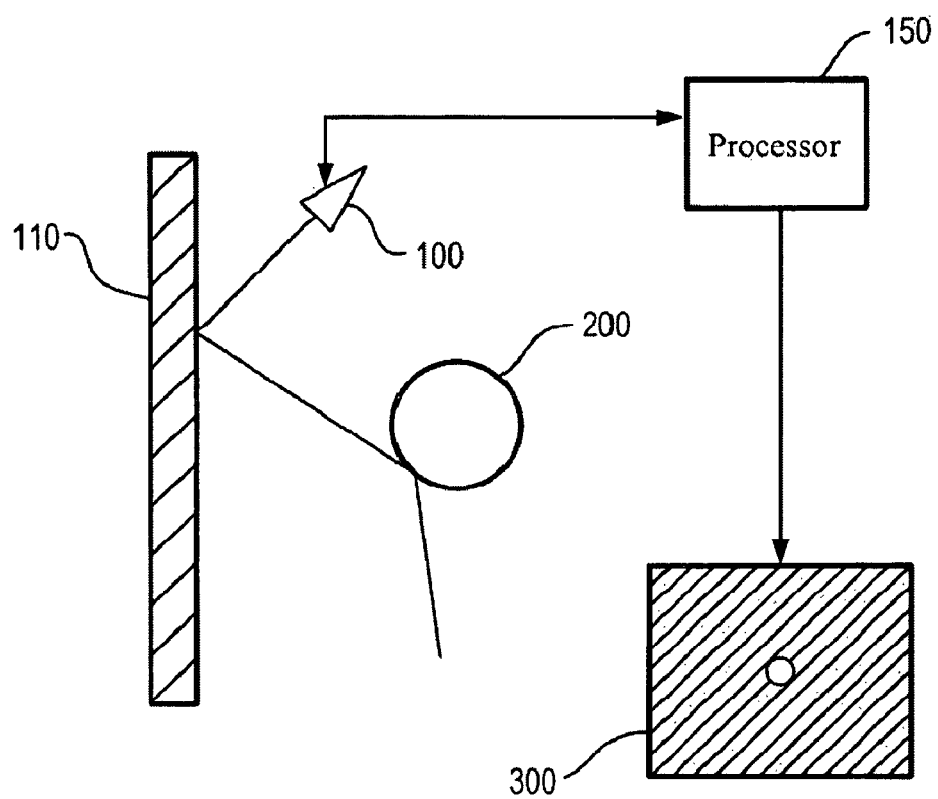
FIG. 1 shows a schematic diagram of an imaging system.

A microwave imaging system is shown in FIG. 1. Such an imaging system is described in U.S. Pat. No. 6,965,340, entitled "System and Method for Security Inspection Using Microwave Imaging," incorporated herein by reference.

In operation, source/receive antenna 100 illuminates programmable array panel 110. Processor 150 controls the individual elements of programmable array panel 110, and micro waves from source/receive antenna 100 to scan a particular voxel in three dimensional space, in particular, subject 200. While shown in FIG. 1 as coincident, source and receive antennas may be separate. If, as shown in Fig, 1, subject 200 is opaque, the image produced as 300, does not reveal a true indication of subject 200

Figure 2:
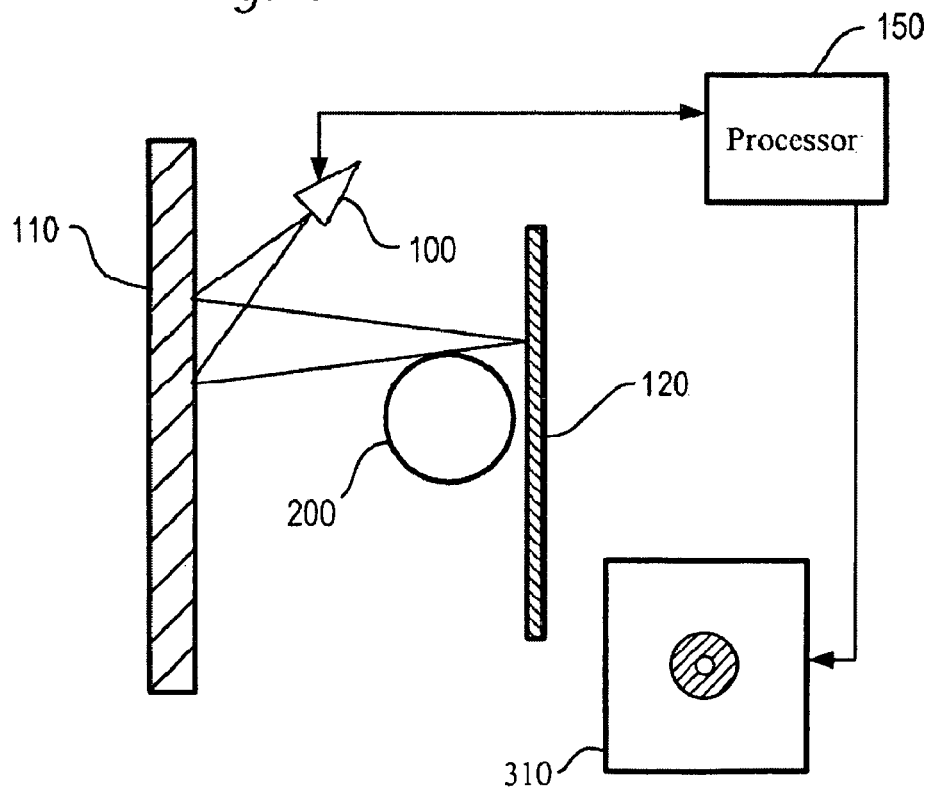
FIG. 2 shows a schematic diagram of an imaging system using a reflector.

According to the present invention, and as shown in FIG. 2, reflective surface 120 is placed within the scan range of source/receive antenna 100 and programmable array panel 110. Now the resulting image may be analyzed by processor 150 using not only microwaves reflected by subject 200, as in normal mode operation but also including the additional silhouette information provided by reflective surface 120. As shown in image 310 of FIG. 2, subject 200 produces a clear silhouette.

In one embodiment of the present invention, imaging data is effectively combined by displaying the maximal amplitude of the scan in the Z direction. Referring to FIG. 2, the Z direction of the scan is between array panel 110 and reflective surface 120. As subject space is scanned in (X, Y, Z) voxels, that scan including reflective surface 120, retaining the maximal amplitude in the Z direction for a given X and Y effectively combines imaging modalities, providing a silhouette of subject 200 at the same time retaining strong signals reflecting from subject 200.

In some applications, it may be beneficial to initially display just silhouette information, which may be obtained by scanning reflective surface 120.

Figure 3:
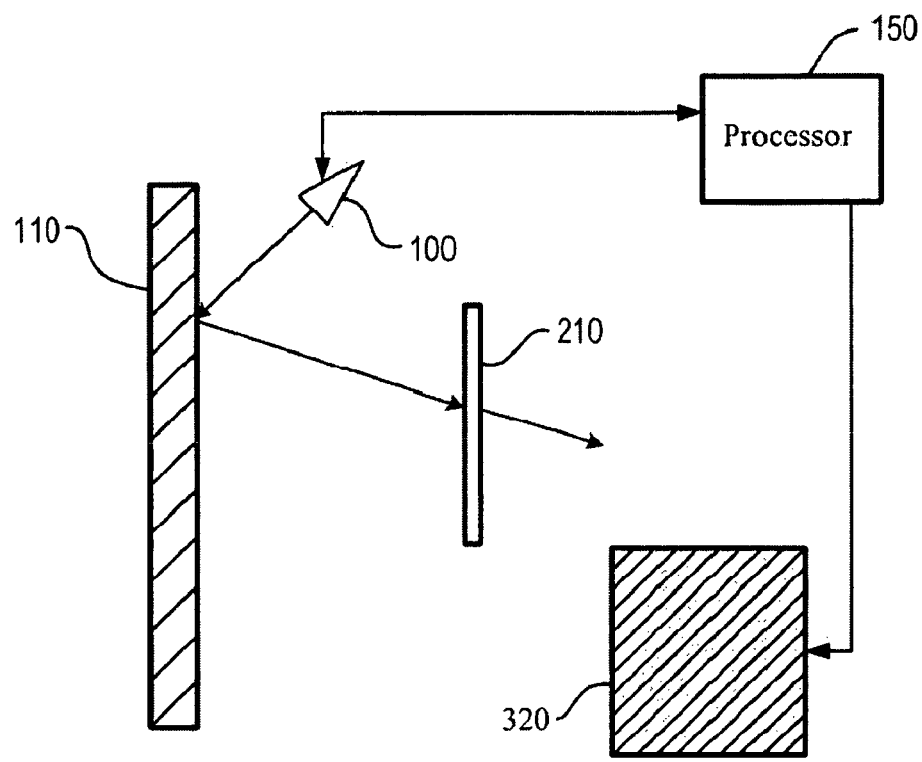
FIG. 3 shows a second schematic diagram of an imaging system.

FIG. 3 shows an imaging system with a translucent subject 210. As shown in simulated image 320, subject 210 is not visible.

Figure 4:
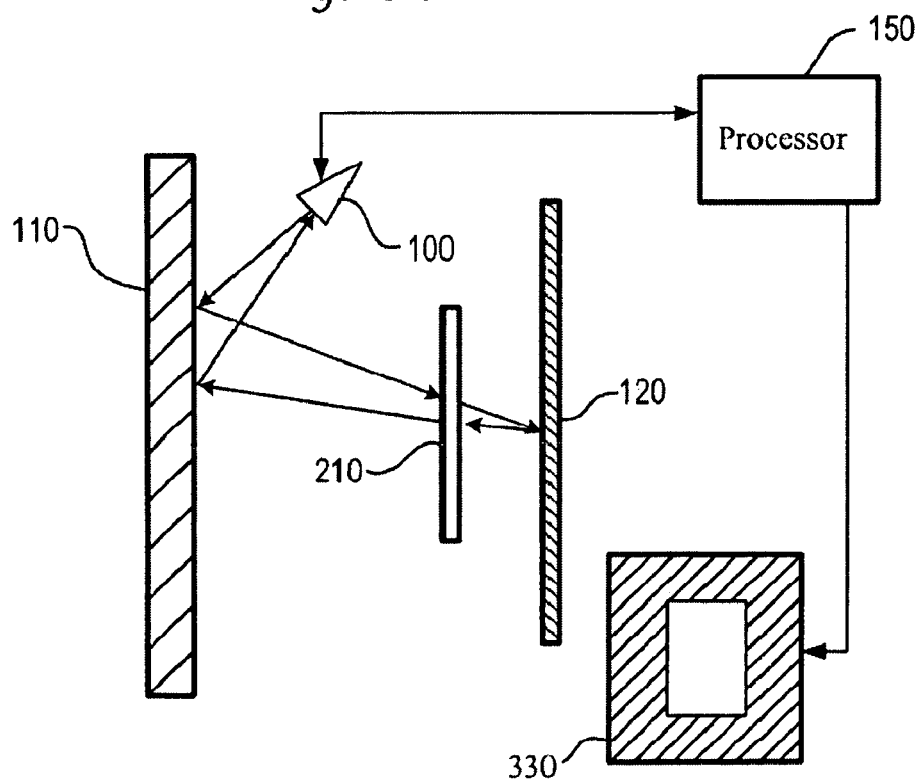
FIG. 4 shows a second schematic diagram of an imaging stem using a reflector.

According to the present invention and as shown. FIG. 4, with reflective surface 120 present, normal mode scanning information may be combined by processor 150 with silhouette information provided by scanning reflective surface 120. This produces simulated image 330, displaying subject 210. For translucent subjects, such as adipose tissue, scanning reflective surface 120 passes beam energy through subject 210 twice, increasing the effects of variations in the material on beam energy.

While the embodiments of the present invention have been illustrated in detail, it should be apparent that modifications and adaptations to these embodiments may occur to one skilled in the art without departing from the scope of the present invention as set forth in the following claims.

The invention claimed is:

1. An imaging system for imaging a subject in a predetermined scan range comprising:
   a programmable array panel operating under control of a processor, the panel operable to direct a beam of microwave illumination from a source toward a subject within the predetermined scan range, and to further direct microwave energy reflected from a subject within the scan range to a receiver,
   the processor operable to receive a measure of the intensity of the energy reaching the receiver, a reflective surface mounted within the scan range, and the processor operable to produce an image of the subject by controlling the programmable array panel to scan at least the reflective surface.

2. The imaging system of claim 1 where the image produced includes a silhouette of the subject.

3. The imaging system of claim 1 where the image is produced by the processor further combining information on energy reflected from the subject scanned within the scan range with information on energy reflected from the reflective surface to produce an image of the subject.

4. The imaging system of claim 3 where the processor combines information on energy reflected from a subject scanned within the scan range with information on energy reflected from the reflective surface by displaying the maximal received amplitude along one scan axis.

5. A method of imaging a subject in a predetermined scan Range, the method comprising:
   illuminating a programmable array panel with microwave energy from a source,
   operating the programmable array panel to direct microwave energy from the source to a target voxel in the scan range,
   capturing microwave energy reflected from the target voxel, and
   operating the programmable array panel to scan at least a reflecting surface in the scan range, producing an image of the subject.

6. The method of claim 5 where the image produced includes a silhouette of the subject.

7. The method of claim 5 where the step of operating the programmable array panel comprises: operating the programmable array panel to scan the scan range, combining energy reflected from a subject in the scan range with energy reflected from a reflecting surface in the scan range to produce an image of the subject.

8. The method of claim 7 where combining energy reflected from a subject in the scan range with energy reflected from a reflecting surface in the scan range further comprises: displaying the maximal captured energy from voxels along one scan axis.

* * * * *

UNITED STATES PATENT AND TRADEMARK OFFICE
CERTIFICATE OF CORRECTION

| | | |
|---|---|---|
| PATENT NO. | : 7,843,383 B2 | Page 1 of 1 |
| APPLICATION NO. | : 11/552749 | |
| DATED | : November 30, 2010 | |
| INVENTOR(S) | : William Weems et al. | |

It is certified that error appears in the above-identified patent and that said Letters Patent is hereby corrected as shown below:

On the face page, in field (57), under (Abstract), in column 2, lines 3-4, delete "relative" and insert -- reflective --, therefor.

In column 1, line 18, delete "Oct. 16, 007;" and insert -- Oct. 16, 2007; --, therefor.

In column 4, line 17, in Claim 5, delete "Range," and insert -- range, --, therefor.

Signed and Sealed this
Eighth Day of February, 2011

David J. Kappos
*Director of the United States Patent and Trademark Office*